United States Patent
Jamison et al.

(10) Patent No.: US 11,459,837 B2
(45) Date of Patent: Oct. 4, 2022

(54) METHOD TO OPTIMIZE TRIPPING VELOCITY PROFILES

(71) Applicant: Halliburton Energy Services, Inc., Houston, TX (US)

(72) Inventors: Dale E. Jamison, Humble, TX (US); Robert L. Williams, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 76 days.

(21) Appl. No.: 17/133,196

(22) Filed: Dec. 23, 2020

(65) Prior Publication Data

US 2022/0195819 A1    Jun. 23, 2022

(51) Int. Cl.
  *E21B 19/16* (2006.01)
  *G01N 11/02* (2006.01)
  *E21B 47/06* (2012.01)
  *G01N 11/00* (2006.01)

(52) U.S. Cl.
  CPC ............ *E21B 19/165* (2013.01); *E21B 47/06* (2013.01); *G01N 11/02* (2013.01); *G01N 2011/0026* (2013.01)

(58) Field of Classification Search
  CPC ........ E21B 19/165; E21B 19/16; E21B 47/06; G01N 11/02; G01N 2011/0026
  See application file for complete search history.

(56) References Cited

U.S. PATENT DOCUMENTS

| | | | |
|---|---|---|---|
| 4,566,318 A | 1/1986 | Rao et al. | |
| 9,957,790 B2 * | 5/2018 | Hildebrand | ............. E21B 44/00 |
| 10,138,722 B2 | 11/2018 | Magnuson | |
| 2013/0220620 A1 | 8/2013 | Jamison et al. | |
| 2015/0142318 A1 | 5/2015 | Hildebrand et al. | |
| 2018/0100392 A1 | 4/2018 | Kleinguetl et al. | |
| 2019/0120023 A1 | 4/2019 | Ocegueda-Hernandez et al. | |
| 2019/0188618 A1 * | 6/2019 | Hildebrand | ...... G06Q 10/06312 |

FOREIGN PATENT DOCUMENTS

| | | |
|---|---|---|
| CN | 110284847 | 9/2019 |
| WO | 2016-099536 | 6/2016 |

OTHER PUBLICATIONS

International Search Report and Written Opinion for Application No. PCT/US2020/067575, dated Sep. 23, 2021.

* cited by examiner

*Primary Examiner* — Caroline N Butcher
(74) *Attorney, Agent, or Firm* — Tenley Krueger; C. Tumey Law Group PLLC

(57) ABSTRACT

Systems and methods of the present disclosure relate to optimizing a tripping velocity profile for pipes in a wellbore. A method for optimizing a tripping velocity profile for a pipe, comprising: determining a static gel strength of a fluid of a wellbore; determining an acceleration curve for the pipe in the wellbore based on wellbore pressure constraints, wherein the wellbore pressure constraints are based in part on the static gel strength of the fluid; determining a deceleration curve for the pipe; and combining the acceleration curve with the deceleration curve to provide the tripping velocity profile for the pipe.

20 Claims, 8 Drawing Sheets

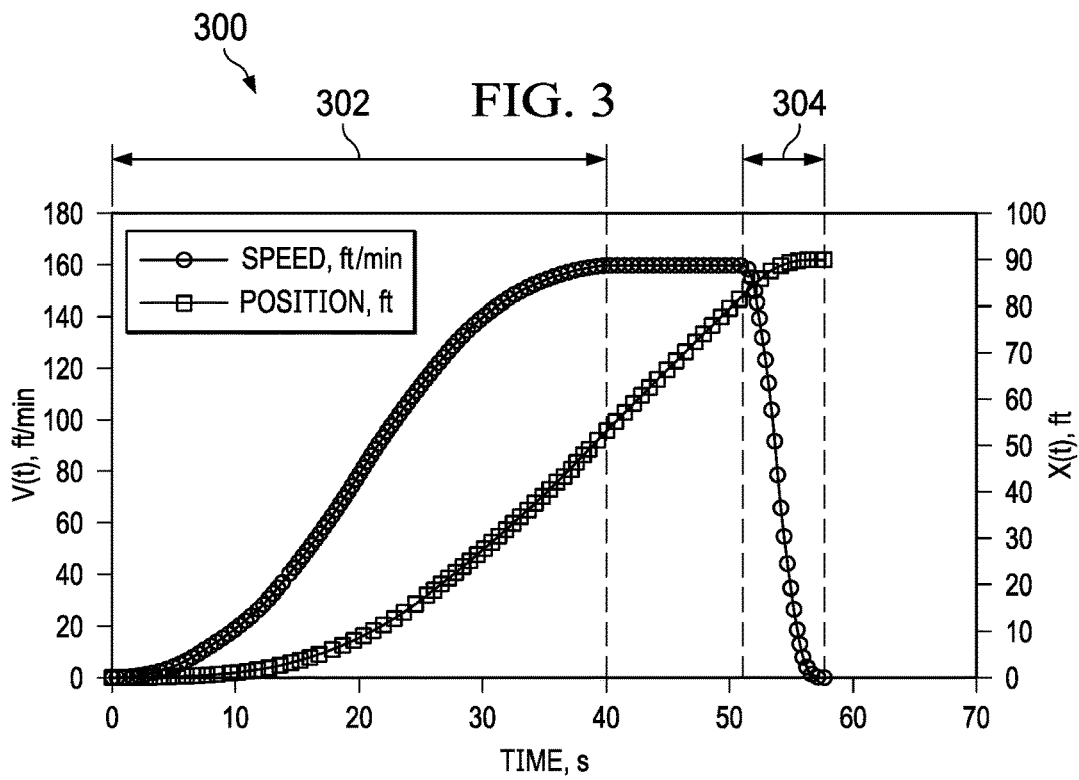

METHOD TO OPTIMIZE TRIPPING VELOCITY PROFILES

BACKGROUND

During wellbore operations, pipe may be inserted into a wellbore ("tripping in"), or pulled out from the wellbore ("tripping out") for various purposes, such as changing of a drill bit or other downhole tool, or setting a conduit such as casing or a liner in the wellbore.

Tripping may be speed constrained due to hydrostatic fluid pressure changes in the wellbore. Fluid displacement due to tripping the pipe combined with viscous effects of the drilling fluid ("mud") in the wellbore may cause fluctuations in the hydrostatic pressure of the drilling fluid.

For example, if the hydrostatic pressure is increased due to excessive speed, a fracture pressure of one or more exposed formations in an uncased part of the wellbore may be exceeded ("surge"). Conversely, a decrease in hydrostatic pressure caused by excessive speed may result in the hydrostatic pressure being reduced below a formation fluid or pore pressure of the exposed formations ("swab"). Additionally, the tripping of the pipe may also be constrained due to mechanical jerk of the pipe as it is accelerated or decelerated through the wellbore; if jerk limits are exceeded for certain pipe string components, damage may occur. Accordingly, various issues may arise during tripping of the pipe.

BRIEF DESCRIPTION OF THE DRAWINGS

These drawings illustrate certain aspects of some examples of the present disclosure and should not be used to limit or define the disclosure.

FIG. 3 illustrates a graph depicting acceleration and deceleration times for the pipe, in accordance with examples of the present disclosure;

FIG. 4 illustrates a graph depicting acceleration and mechanical jerk curves for the pipe, in accordance with examples of the present disclosure;

DETAILED DESCRIPTION

The present disclosure generally relates to techniques for determining an optimum tripping or running speed for downhole tubulars or pipes such as drill strings and/or casing strings. In particular examples, the techniques described herein may consider or account for a drilling fluid gelation and break down rate; maximum and minimum equivalent static density (ESD) such as surge and swab pressures; fluid momentum; and/or mechanical jerk. The disclosed techniques may use gel breakdown information which may distinguish how much of a gel is stiff and how much is fragile, as well as the gel structure decay with shear and time for each.

In order to optimize and automate the process of tripping pipe, the techniques as described herein may be utilized with real-time rheology monitoring, hydraulics, and/or drilling fluids graphic software and/or hardware. The physical phenomena of gel impact, fluid inertia, and hydraulics for peak and minimum tripping pressures may be simulated using math functions. In some examples, a cubic parabola with derivatives that are continuous through the $3^{rd}$ derivative may be utilized as shown via Equations 1 to 4:

$$x(t)=kt^3 \quad (1)$$

$$V(t)=3kt^2 \quad (2)$$

$$a(t)=6kt \quad (3)$$

$$J(t)=6k \quad (4)$$

where x(t) is a position of pipe during tripping; t is time; k is a constant; V(t) is velocity and the first derivative of Equation 1; a(t) is acceleration and the second derivative of Equation 1; and J(t) is mechanical jerk and the third derivative of Equation 1.

Figure 1:
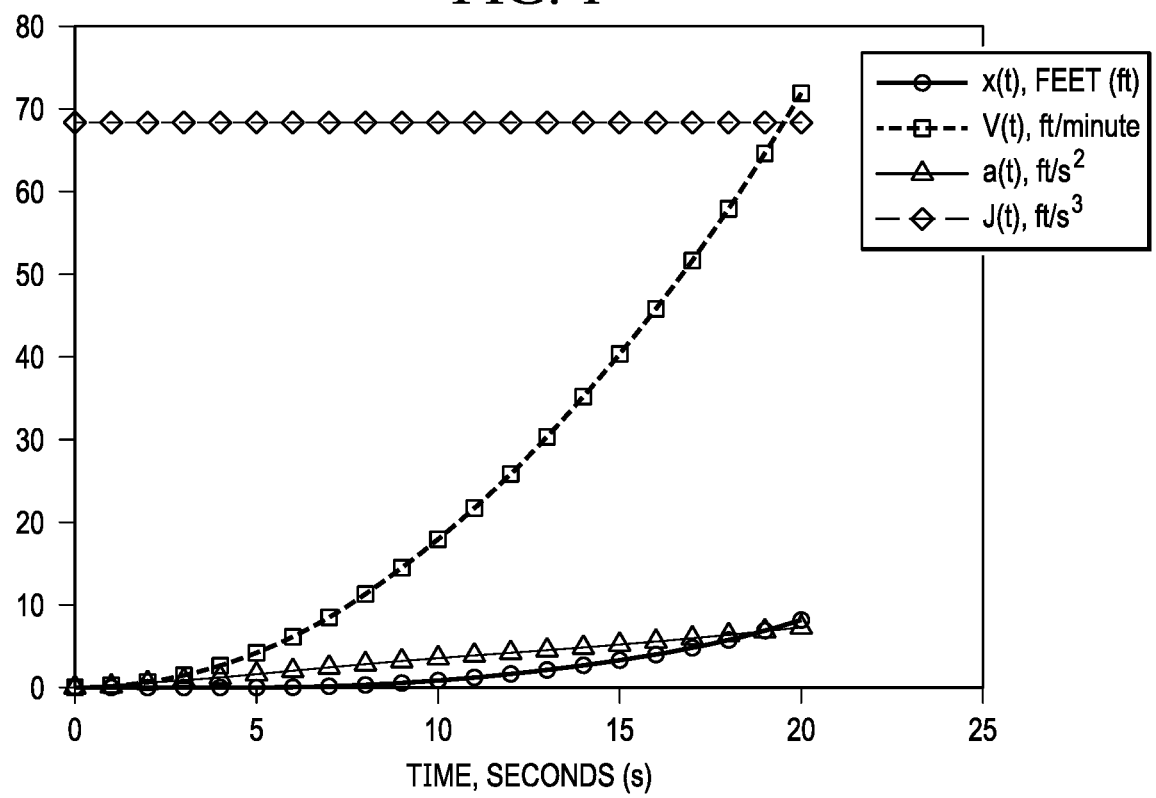
FIG. 1 is a graph illustrating kinematic curves for pipe movement during tripping operations, in accordance with examples of the present disclosure.

FIG. 1 is a graph 100 illustrating curves corresponding to Equations 1 to 4 during tripping operations, in accordance with examples of the present disclosure. In some examples, an acceleration of pipe in a wellbore may be provided by real-time rheology monitoring, hydraulics, drilling simulation, and/or drilling fluids graphic software and/or hardware. In particular examples of the present disclosure, the cubic parabola, x(t), may be flipped to provide a maximum tripping velocity profile. As previously noted, Equations 1 to 4 illustrate a cubic parabola including derivatives thereof. The derivatives may be continuous through the $3^{rd}$ derivative.

Figure 2:
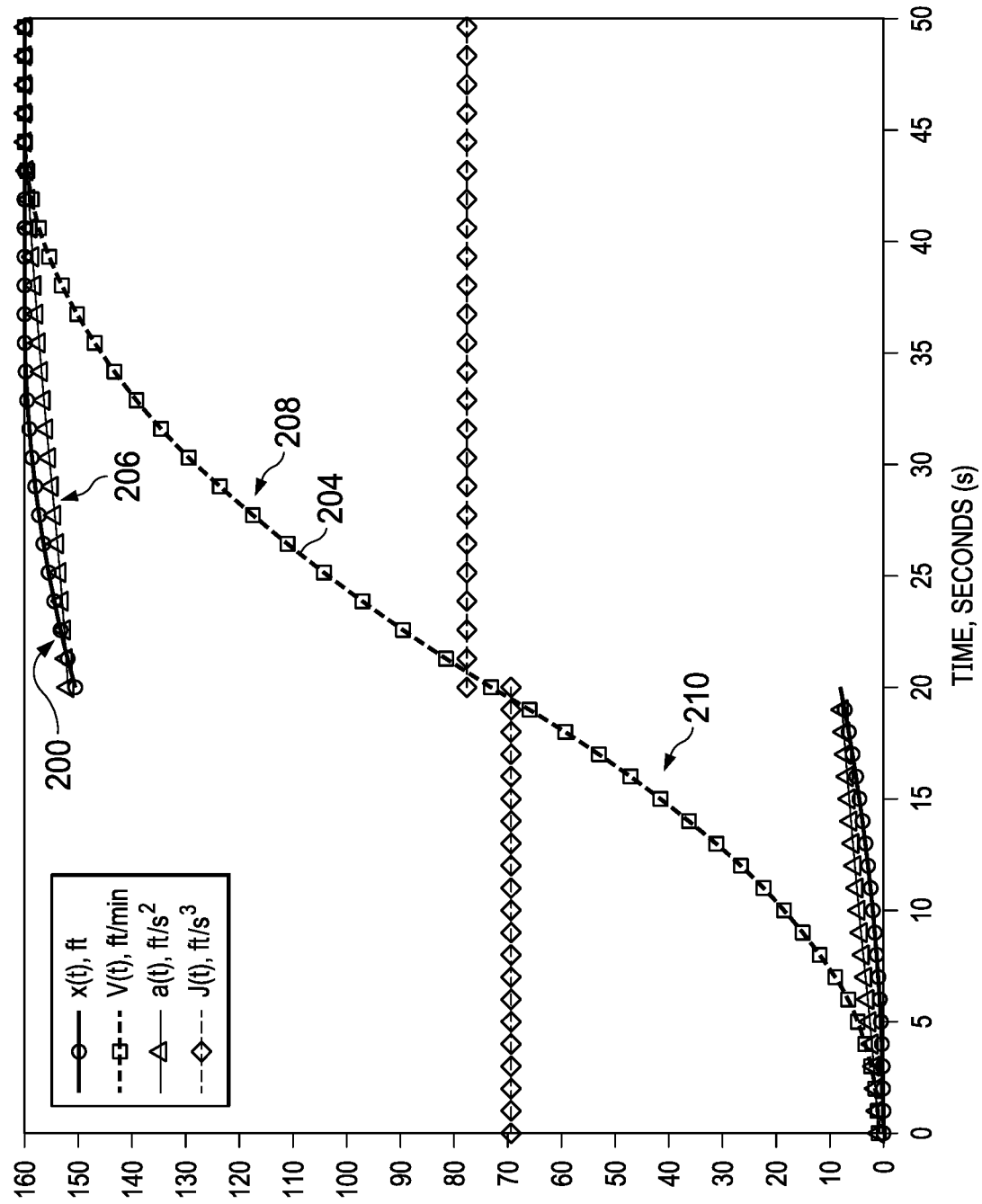
FIG. 2 illustrates a cubic parabola representing a position for a pipe, in accordance with examples of the present disclosure.

FIG. 2 illustrates the cubic parabola, x(t), flipped or inverted to form a cubic parabola 200, in accordance with examples of the present disclosure. For example, the cubic parabola, x(t), may include data points that may be flipped, inverted, or reflected across a line parallel to the x-axis (e.g., y=72) and reflected across a line parallel to the y-axis (e.g., t=20 seconds) to form the cubic parabola 200. After inversion, a deceleration curve 206 may be determined based on Equations 1-4.

The acceleration curve a(t) and the deceleration curve 206 may be combined to provide a continuous maximum velocity curve 204 via Equations 1 to 4, for example. A deceleration duration 208 of the velocity curve 204 may provide a gradual or soft deceleration for the pipe after an acceleration duration 210. The velocity curve 204 may indicate maximum or peak velocities. The peak velocities and times may be modeled variables for tripping operations. Also, the times for acceleration and deceleration may be independent from each other.

FIG. 3 illustrates a graph 300 depicting an acceleration time 302 and a deceleration time 304, in accordance with examples of the present disclosure. The time for acceleration and the time for deceleration may be mutually exclusive or independent of each other. In some examples, the time for acceleration may be greater than the time for deceleration, as illustrated.

FIG. 4 illustrates a graph 400 depicting a curve for acceleration, a(t), and a curve for mechanical jerk, J(t), in accordance with examples of the present disclosure. The rate of change of the acceleration or the derivative thereof may be illustrated as the mechanical jerk and may assist in managing tripping operations by preventing or reducing damage to rig equipment.

Figure 5:
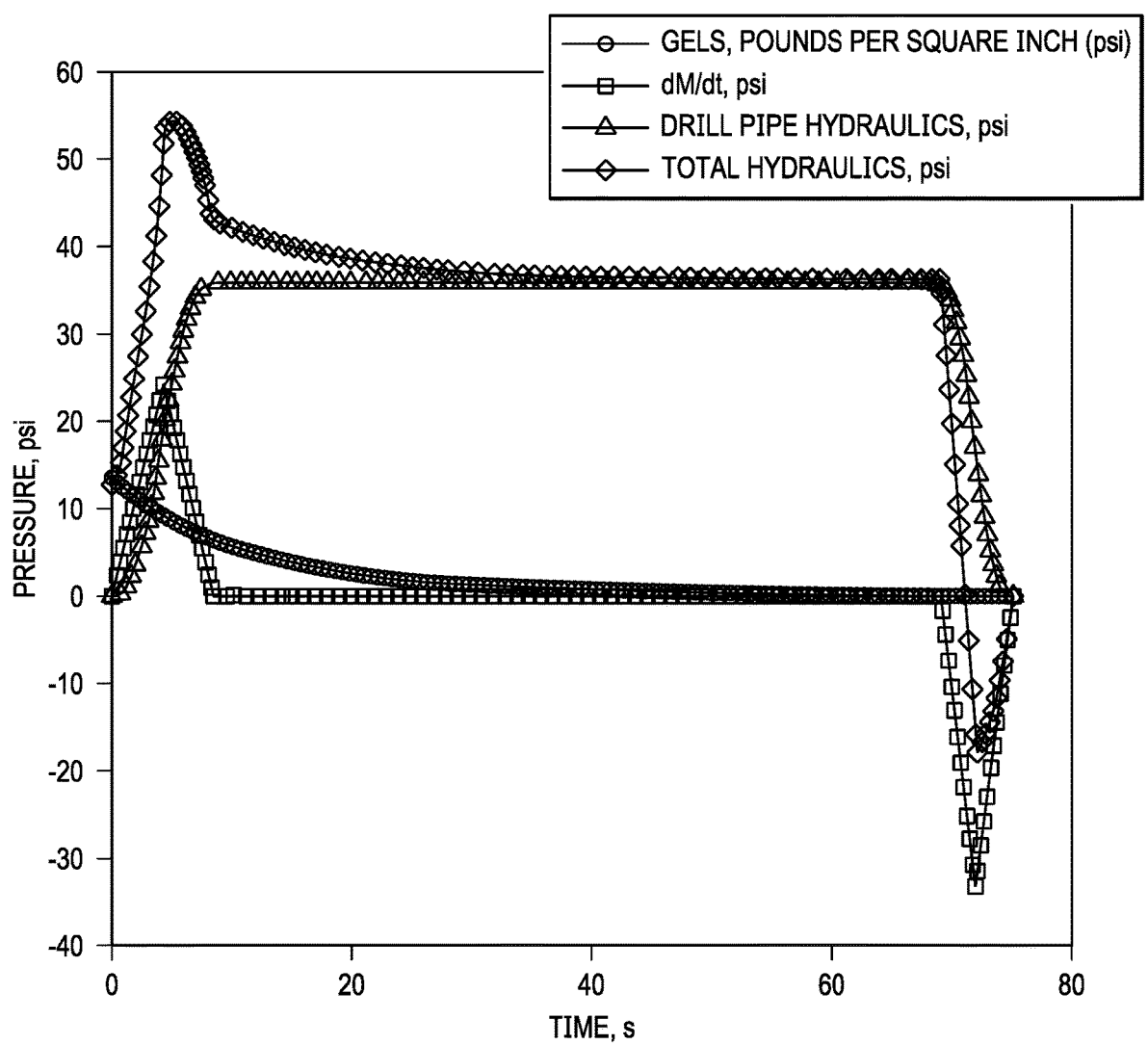
FIG. 5 illustrates discrete sources of pressure during tripping operations, in accordance with examples of the present disclosure.

FIG. 5 illustrates discrete sources of pressure during tripping operations, in accordance with examples of the present disclosure. Total hydraulics and corresponding time while tripping one stand (e.g., 90 feet) of drill pipe in a wellbore is shown. The total hydraulics or the ECD may be the sum of: (1) pressure of the fluid gels (at a quiescent time); (2) inertia (dM/dt) of the drilling fluid as it is accelerated due to the acceleration of the drill pipe; (3) hydraulics of the drill pipe velocity; and (4) the hydrostatic pressure in the wellbore at the point of interest.

Figure 6:
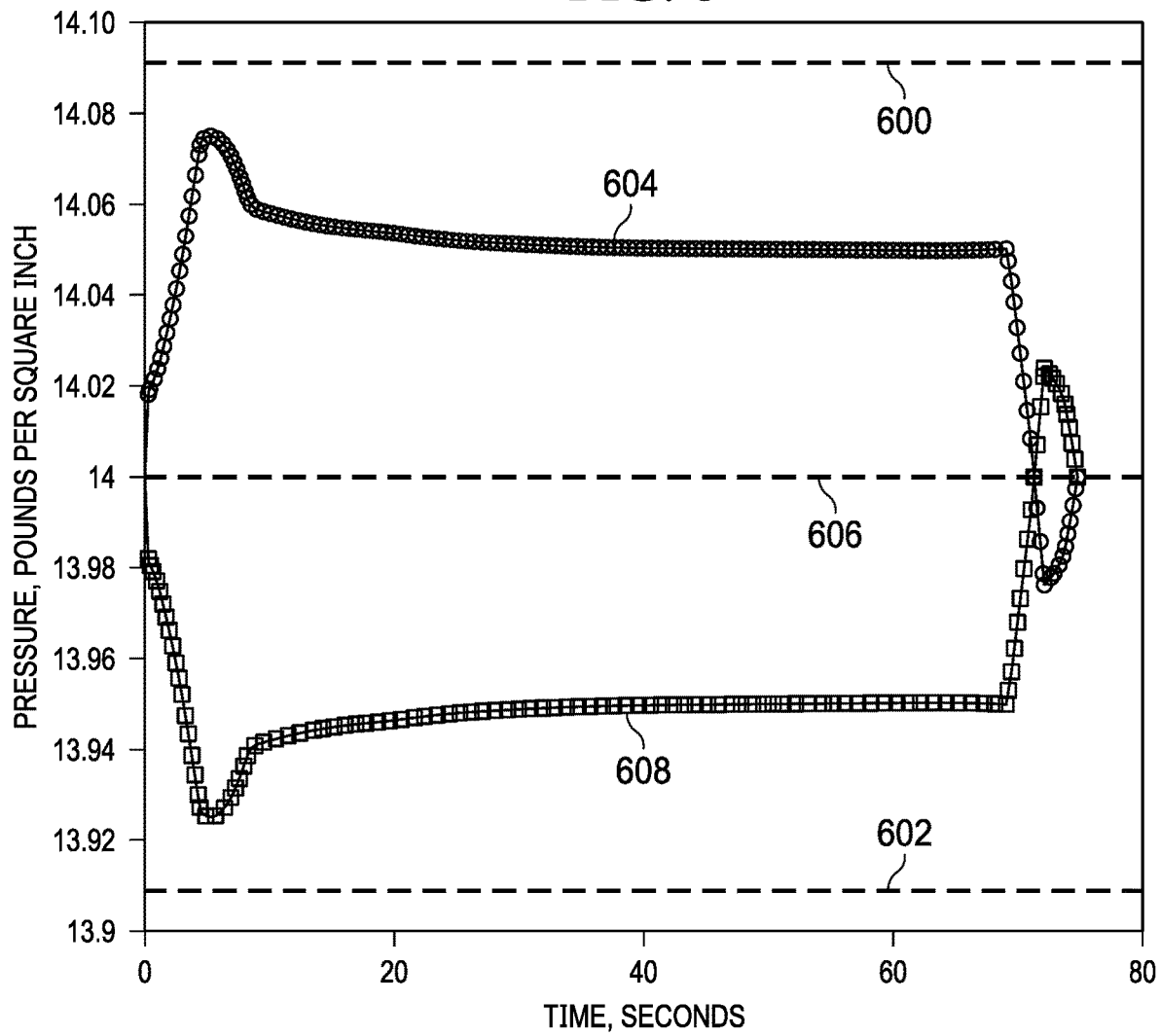
FIG. 6 illustrates pressure responses and limits at a single point in a wellbore, in accordance with examples of the present disclosure.

FIG. 6 illustrates pressure responses and limits at a single point in a wellbore, in accordance with examples of the present disclosure. These limits and pressure responses are illustrated with data points forming various curves and/or lines. For example, line 600 indicates a fracture gradient of a subterranean formation; line 602 indicates a pore pressure of the subterranean formation; curve 604 indicates surge pressures; line 606 indicates equivalent static densities (ESD); and curve 608 indicates swab pressures. The pressure data may be modeled with hydraulics and/or drilling software.

The pressure analysis may be performed for every point in the wellbore that is not cased, to ensure the pressures generated by the pipe movement do not exceed the pressure limitations at any point in the wellbore susceptible to collapse and/or fracturing. The pressure data may be acquired and modeled by any suitable technique as should be understood by one having skill in the art with the benefit of this disclosure. For example, various pressure testing tools and modeling software may be implemented to acquire and model wellbore pressures and fluids.

Figure 7:
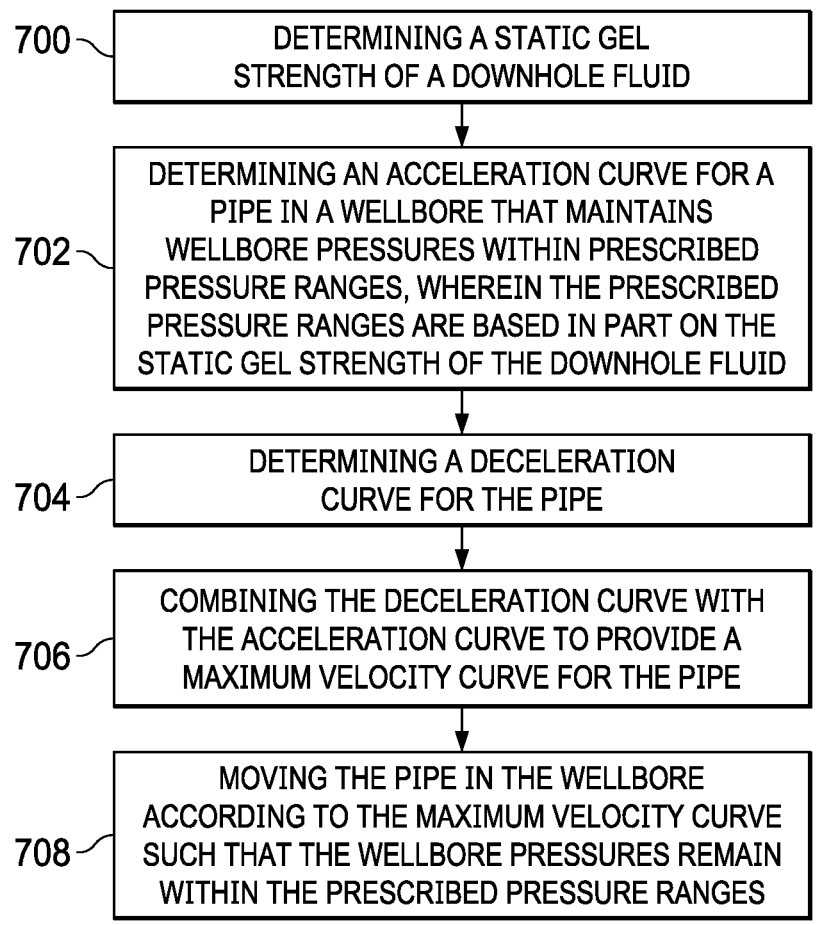
FIG. 7 illustrates an exemplary workflow for optimizing tripping velocity profiles, in accordance with examples of the present disclosure.

FIG. 7 illustrates an exemplary workflow for optimizing tripping velocity profiles, in accordance with examples of the present disclosure. At step 700, a gel strength of a fluid (e.g., drilling fluid) may be determined based on the time the fluid was static or quiescent (e.g., non-moving such as during a connection or disconnection of pipe). The predicted gel strength may be calculated at an active mud pit by a gel strength analyzer.

At step 702, hydraulics or drilling modeling software and hardware may be utilized to calculate a maximum acceleration curve a(t) that may be achieved while maintaining acceptable, predetermined, or prescribed pressure ranges (e.g., total hydraulic pressure or ECDs), as shown on FIGS. 5 and 6, while considering the gel decomposition throughout the movement of the pipe.

At step 704, the deceleration curve 206 may be determined, as shown on FIG. 2. At step 706, the acceleration curve a(t) and the deceleration curve 206 may be combined to provide a peak running speed or maximum velocity curve 204 (e.g., as shown on FIG. 2) that can be achieved while maintaining acceptable, predetermined, or prescribed pressure ranges, as shown on FIG. 6 (e.g., FIG. 6).

At step 708, the pipe may be moved in the wellbore according to the maximum velocity curve, and the discrete sources of pressure (e.g., FIG. 5) in the wellbore may be monitored to ensure that the maximum velocity curve for the tripping of the stand of pipe remains within acceptable, predetermined, or prescribed pressure ranges, as shown on FIG. 6. For example, the velocity of the pipe may be managed such that the downhole pressures (e.g., a total hydraulic pressure) are less than the formation fracturing pressures and above the formation pore pressures. Also, mechanical jerk may be determined and managed (e.g., FIG. 4) in real-time, to prevent or minimize damage to rig equipment.

In some examples, an automated system may control the velocity of the pipe in real-time to manage the various pressures and the mechanical jerk encountered during the tripping. The velocity curve 204 may be calculated for each stand of pipe because the temperatures of the fluid such as drilling fluid may change during the tripping process thereby changing the properties of the drilling fluid that affect the rheology, density, and/or gel build-up of the drilling fluid. Therefore, techniques as described herein may utilize software and/or hardware to model the wellbore fluids.

Figure 8:
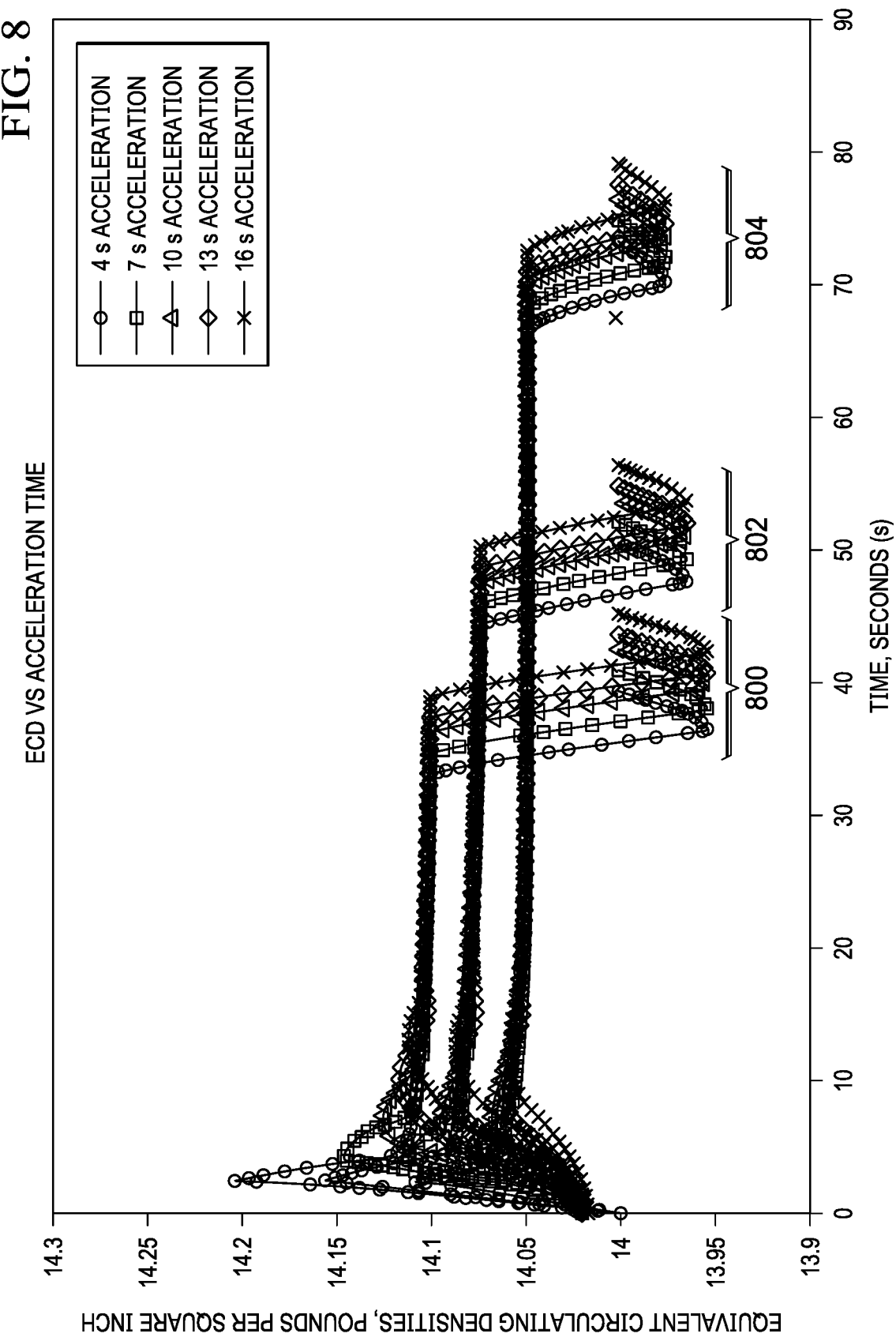
FIG. 8 illustrates a graph depicting ECDs versus acceleration times, in accordance with examples of the present disclosure.

FIG. 8 illustrates a graph depicting ECDs versus acceleration times, in accordance with examples of the present disclosure. The acceleration times may vary with the ECDs. For example, at a mud weight (ECD) of about 14 pounds per gallon, curves 800 indicate acceleration times for a maximum tripping velocity of 80 feet per minute; curves 802 indicate acceleration times for a maximum tripping velocity of 120 feet per minute; and curves 804 indicate acceleration times for a maximum tripping velocity of 160 feet per minute.

Figure 9:
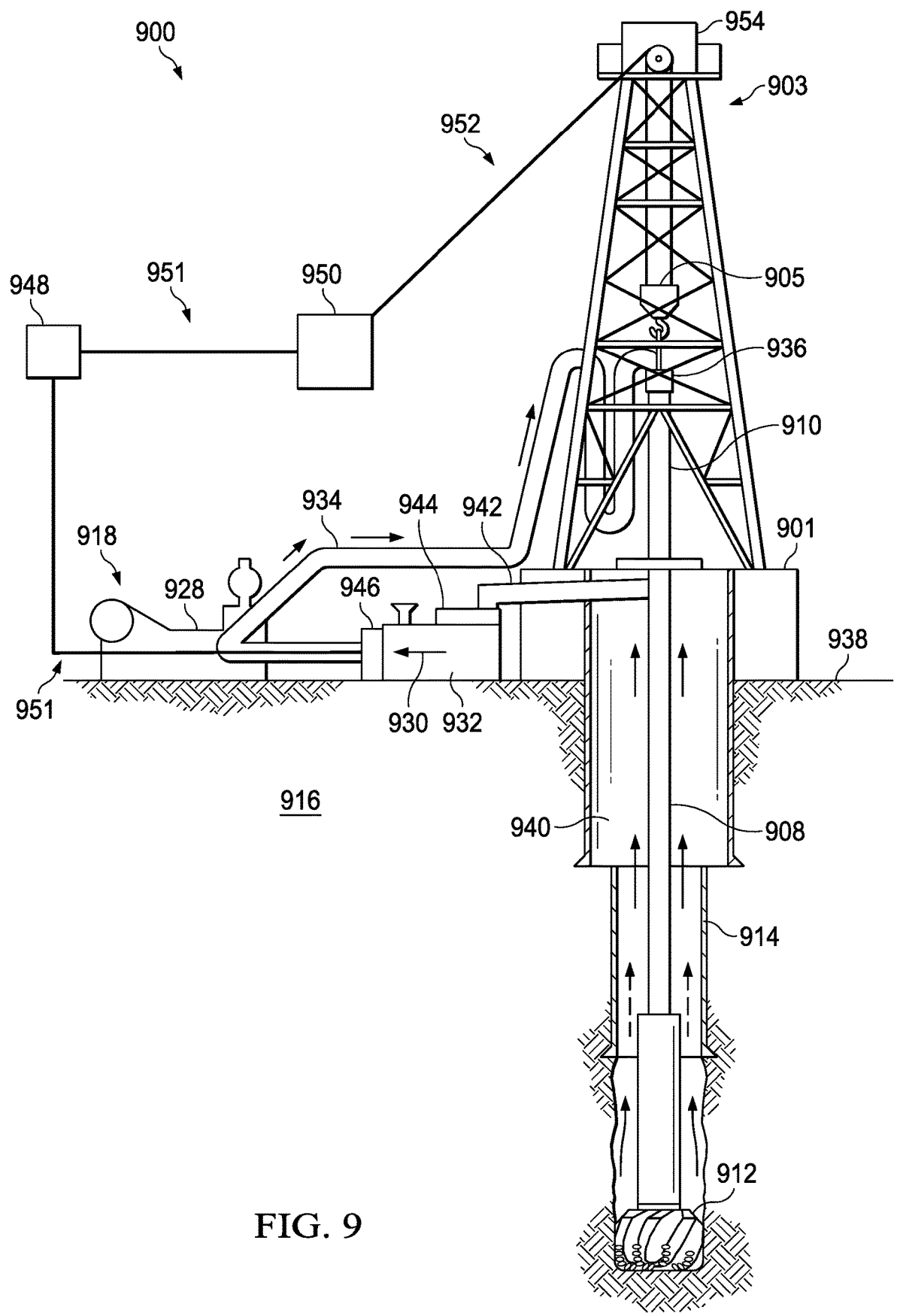
FIG. 9 illustrates a system for utilizing the maximum velocity curve to optimize a tripping operation, in accordance with examples of the present disclosure.

FIG. 9 illustrates a system 900 for utilizing the maximum velocity curve to optimize a tripping operation, in accordance with examples of the present disclosure. The system 900 may be positioned in an onshore or offshore environment. As illustrated, the system 900 may include a drilling platform 901 that supports a derrick 903 having a traveling block 905 for raising and lowering a pipe string 908. The pipe string 908 may include any suitable downhole tubulars such as casing strings and/or drill strings for examples. The pipe string 908 may include stands of pipe (e.g., 90 feet (30 meters) sections of pipe) In some examples, a top drive 910 may support the pipe string 908.

In some examples, a drill bit 912 may be attached to the distal end of the pipe string 908 and may be driven either by a downhole motor and/or via rotation of the pipe string 908 from the well surface. Without limitation, the drill bit 912 may include, roller cone bits, PDC bits, natural diamond bits, any hole openers, reamers, coring bits, and the like. As the drill bit 912 rotates, it may create a wellbore 914 that penetrates a subterranean formation 916. As the wellbore 914 is drilled, stands of pipe may be connected to form the pipe string 908. Alternatively, stands of pipe may be disconnected and subsequently racked during a bit trip (e.g., bit replacement) or otherwise pulling out of the wellbore 914, for example.

The system 900 may further include a circulatory system 918 that includes a mud pump 928 to convey drilling fluid 930 from a mud pit 932 into the wellbore 914. The mud pump 928 may include pumps, compressors, or motors (e.g., surface or downhole) used to move the drilling fluid 930, as well as any valves or related joints used to regulate the pressure or flowrate of the drilling fluid 930. Additionally, sensors (e.g., pressure, temperature, flow rate) and gauges may be in fluid communication with the circulatory system 918.

The mud pump 928 may circulate the drilling fluid 930 through a feed pipe 934 and to a swivel 936, which may convey the drilling fluid 930 downhole through the pipe string 908 and through one or more orifices in the drill bit 912. The drilling fluid 930 be circulated back to a surface 938 via an annulus 940 defined between the pipe string 908 and the wall(s) of the wellbore 914.

At the surface 938, the system 900 may also include a flow line 942 discharging the drilling fluid 930 onto a solids control device 944 (e.g., shale shaker) of the system 900 to remove drill cuttings. The drilling fluid 930 separated via the solids control device 944 may flow into the mud pit 930 for circulation back into the wellbore 914.

In some examples, a gel strength analyzer 946 may be in fluid communication with the drilling fluid 930, such as at the mud pit 932. Any suitable gel strength analyzer may be utilized as should be understood by one having skill in the art with the benefit of this disclosure.

In particular examples, the circulatory system 918 may cease to circulate the drilling fluid 930 therethrough, such as during a connection or disconnection of pipe, thereby allowing for the gel strength analyzer 946 to measure properties of the drilling fluid 930 and send information to the system controller 948 via a communication path 951 (e.g., wired or wireless). The system controller 948 may be utilized to implement the techniques as described herein to optimize a tripping velocity profile. In particular examples, the information may include or be used to determine static gel strength, drilling fluid gelation rate and break down rate, quantity of stiff gel, quantity of fragile gel, and decay time for each of the stiff gel and the fragile gel.

The system controller 948 may include a display, a storage unit, and/or any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, the system controller 948 may be a computer, a network storage device, or any other suitable device and may vary in size, shape, performance, functionality, and price. The system controller 948 may include a processing unit (e.g., microprocessor, central processing unit, programmable logic controller (PLC), etc.) that may process data by executing software or instructions obtained from a local non-transitory computer readable media (e.g., optical disks, magnetic disks). The non-transitory computer readable media may store software or instructions of the methods described herein. Non-transitory computer readable media may include any instrumentality or aggregation of instrumentalities that may retain data and/or instructions for a period of time. The non-transitory computer readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

The system controller 948 may also include input device(s) (e.g., keyboard, mouse, touchpad, etc.) and output device(s) (e.g., monitor, printer, etc.). The input device(s) and output device(s) provide a user interface. For example, the system controller 948 may enable an operator to select and perform analysis, view collected data, view analysis results, and/or perform other tasks.

In some examples, the system controller 948 may utilize drilling, rheology, and/or hydraulics software and hardware to monitor wellbore conditions including wellbore pressures and wellbore fluid properties, and determine a maximum acceleration curve that can be achieved while maintaining acceptable, predetermined, or prescribed pressure ranges as shown on FIG. 6, as previously noted. Based on the maximum acceleration curve, the system controller 948 may determine the maximum velocity curve based on Equations 1 to 4.

For example, the system controller 948 may perform the steps of FIG. 7, in real-time, to optimize a tripping velocity profile (e.g., the velocity curve 204 shown on FIG. 2) for moving pipe into the wellbore 914 and out of the wellbore 914. The system controller 948 may be in communication with drawworks 950 via a communication path 951 and may control movement of the pipe string 908 via the drawworks 950. The drawworks 950 may raise and lower the pipe string 908 in the wellbore 914 via a cable 952 that passes through a crown 954 positioned at a top of the derrick 903 to the traveling block 905. The system controller 948 may increase, decrease, and/or maintain a running speed of pipe based on the maximum velocity profile (e.g., the velocity curve 204 shown on FIG. 2), the pressures (e.g., shown on FIGS. 5 and 6) in the wellbore 914, and mechanical jerk.

Accordingly, the systems and methods of the present disclosure allow for optimization of tripping velocity profiles. The systems and methods may include any of the various features disclosed herein, including one or more of the following statements.

Statement 1. A method for optimizing a tripping velocity profile for a pipe, comprising: determining a static gel strength of a fluid of a wellbore; determining an acceleration curve for the pipe in the wellbore based on wellbore pressure constraints, wherein the wellbore pressure constraints are based in part on the static gel strength of the fluid; determining a deceleration curve for the pipe; and combining the acceleration curve with the deceleration curve to provide the tripping velocity profile for the pipe.

Statement 2. The method of the statement 1, wherein the determining the deceleration curve comprises inverting a cubic parabola, wherein the cubic parabola is a position function for the pipe.

Statement 3. The method of any one of the preceding statements, further comprising moving the pipe in the wellbore based on the tripping velocity profile and the wellbore pressure constraints.

Statement 4. The method of any one of the preceding statements, further comprising determining mechanical jerk based on the acceleration curve or the deceleration curve.

Statement 5. The method of any one of the preceding statements, further comprising determining the acceleration curve for the pipe that causes equivalent circulating densities (ECD) in the wellbore to be less than a formation fracture pressure and greater than a pore pressure.

Statement 6. The method of any one of the preceding statements, further comprising determining the tripping velocity profile for a stand of pipe.

Statement 7. The method of any one of the preceding statements, further comprising determining the static gel strength during a connection of the pipe to another pipe.

Statement 8. The method of any one of the preceding statements, further comprising determining the static gel strength during a disconnection of another pipe from the pipe.

Statement 9. A method for optimizing a tripping velocity profile for a pipe, comprising: determining a static gel strength of a fluid of a wellbore; determining an acceleration curve for the pipe in the wellbore that maintains equivalent circulating densities (ECDs) in the wellbore that are less than a formation fracture pressure and greater than a pore pressure, wherein the ECDs are based in part on the static gel strength of the fluid; determining a deceleration curve for the pipe by inverting a cubic parabola; and combining the acceleration curve with the deceleration curve to provide the tripping velocity profile for the pipe.

Statement 10. The method of the statement 9, further comprising moving the pipe in the wellbore based on the tripping velocity profile.

Statement 11. The method of the statement 9 or 10, further comprising determining mechanical jerk based on the acceleration curve or the deceleration curve.

Statement 12. The method of any one of the statements 9-11, further comprising determining the tripping velocity profile for a stand of pipe.

Statement 13. The method of any one of the statements 9-12, further comprising determining the static gel strength during a connection of the pipe to another pipe.

Statement 14. The method of any one of the statements 9-13, further comprising determining the static gel strength during a disconnection of another pipe from the pipe.

Statement 15. The method of any one of the statements 9-14, wherein inverting the cubic parabola comprises inverting a position function for the pipe.

Statement 16. A system for optimizing a tripping velocity profile for a pipe string in a wellbore, comprising: the pipe string disposed in the wellbore, the wellbore comprising a fluid; a gel strength analyzer in fluid communication with the fluid; a system controller in communication with the gel strength analyzer, the system controller configured to: receive static gel strength information of the fluid from the gel strength analyzer; determine an acceleration curve for the pipe string in the wellbore based on wellbore pressure constraints, wherein the wellbore pressure constraints are based in part on the static gel strength of the fluid; determining a deceleration curve for the pipe string; and combining the acceleration curve with the deceleration curve to provide the tripping velocity profile for the pipe string.

Statement 17. The system of the statement 16, wherein the system controller is further configured to move the pipe string in the wellbore based on the tripping velocity profile.

Statement 18. The system of the statement 16 or 17, wherein the system controller is further configured to determine mechanical jerk based on the acceleration curve or the deceleration curve.

Statement 19. The system of any one of the statements 16-18, wherein the system controller is further configured to receive the static gel strength information during a connection of a pipe to the pipe string, or during a disconnection of the pipe from the pipe string.

Statement 20. The system of any one of the statements 16-19, wherein the gel strength analyzer is in fluid communication with a mud pit that is positioned at a surface of the wellbore.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for optimizing a tripping velocity profile for a pipe, comprising:
   determining a static gel strength of a fluid of a wellbore;
   determining an acceleration curve for the pipe in the wellbore based on wellbore pressure constraints, wherein the wellbore pressure constraints are based in part on the static gel strength of the fluid;
   determining a deceleration curve for the pipe; and
   combining the acceleration curve with the deceleration curve to provide the tripping velocity profile for the pipe.

2. The method of claim 1, wherein the determining the deceleration curve comprises inverting a cubic parabola, wherein the cubic parabola is a position function for the pipe.

3. The method of claim 1, further comprising moving the pipe in the wellbore based on the tripping velocity profile and the wellbore pressure constraints.

4. The method of claim 1, further comprising determining mechanical jerk based on the acceleration curve or the deceleration curve.

5. The method of claim 1, further comprising determining the acceleration curve for the pipe that causes equivalent circulating densities (ECD) in the wellbore to be less than a formation fracture pressure and greater than a pore pressure.

6. The method of claim 1, wherein the pipe is included in a stand.

7. The method of claim 1, further comprising determining the static gel strength during a connection of the pipe to another pipe.

8. The method of claim 1, further comprising determining the static gel strength during a disconnection of another pipe from the pipe.

9. A method for optimizing a tripping velocity profile for a pipe, comprising:
    determining a static gel strength of a fluid of a wellbore;
    determining an acceleration curve for the pipe in the wellbore that maintains equivalent circulating densities (ECDs) in the wellbore that are less than a formation fracture pressure and greater than a pore pressure, wherein the ECDs are based in part on the static gel strength of the fluid;
    determining a deceleration curve for the pipe by inverting a cubic parabola; and
    combining the acceleration curve with the deceleration curve to provide the tripping velocity profile for the pipe.

10. The method of claim 9, further comprising moving the pipe in the wellbore based on the tripping velocity profile.

11. The method of claim 9, further comprising determining mechanical jerk based on the acceleration curve or the deceleration curve.

12. The method of claim 9, wherein the pipe is included in a stand.

13. The method of claim 9, further comprising determining the static gel strength during a connection of the pipe to another pipe.

14. The method of claim 9, further comprising determining the static gel strength during a disconnection of another pipe from the pipe.

15. The method of claim 9, wherein inverting the cubic parabola comprises inverting a position function for the pipe.

16. A system for optimizing a tripping velocity profile for a pipe string in a wellbore, comprising:
    the pipe string disposed in the wellbore, the wellbore comprising a fluid;
    a gel strength analyzer in fluid communication with the fluid;
    a system controller in communication with the gel strength analyzer, the system controller configured to:
        receive static gel strength information of the fluid from the gel strength analyzer;
        determine an acceleration curve for the pipe string in the wellbore based on wellbore pressure constraints, wherein the wellbore pressure constraints are based in part on the static gel strength of the fluid;
        determining a deceleration curve for the pipe string; and
        combining the acceleration curve with the deceleration curve to provide the tripping velocity profile for the pipe string.

17. The system of claim 16, wherein the system controller is further configured to move the pipe string in the wellbore based on the tripping velocity profile.

18. The system of claim 16, wherein the system controller is further configured to determine mechanical jerk based on the acceleration curve or the deceleration curve.

19. The system of claim 16, wherein the system controller is further configured to receive the static gel strength information during a connection of a pipe to the pipe string, or during a disconnection of the pipe from the pipe string.

20. The system of claim 16, wherein the gel strength analyzer is in fluid communication with a mud pit that is positioned at a surface of the wellbore.

\* \* \* \* \*